Figure 1:
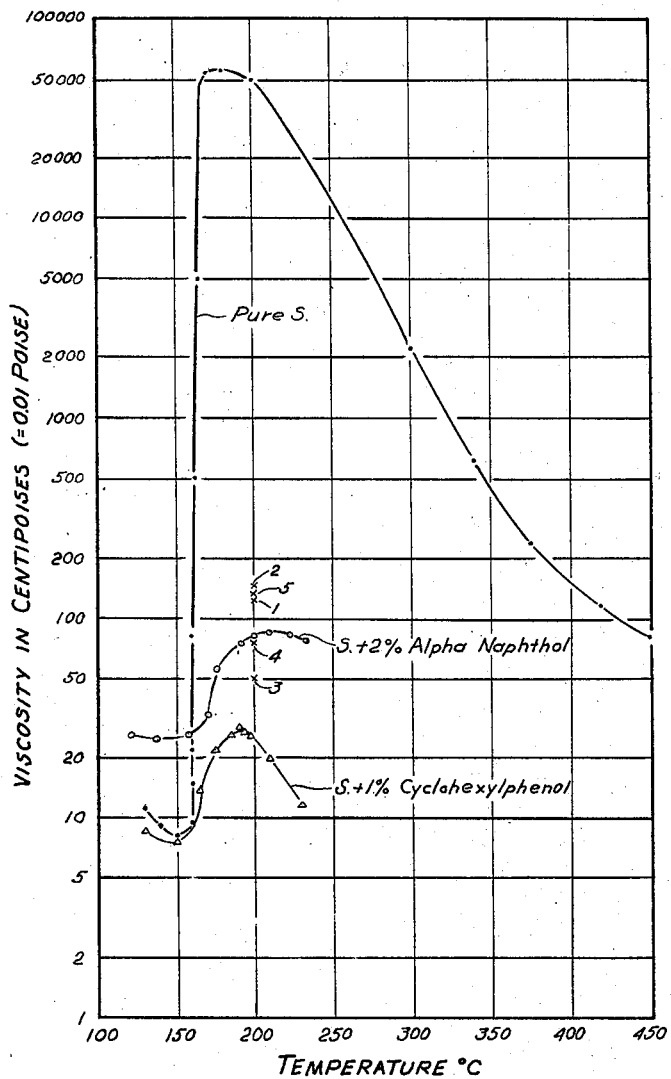

July 29, 1947.　　　　L. F. MAREK　　　　2,424,894
METHOD OF MAKING CARBON BISULFIDE
Filed June 6, 1945　　　2 Sheets-Sheet 1

Inventor
LEROY F. MAREK
By　　　　　
Agent

July 29, 1947.  L. F. MAREK  2,424,894
METHOD OF MAKING CARBON BISULFIDE
Filed June 6, 1945   2 Sheets-Sheet 2

Inventor
LEROY F. MAREK
By
Agent

Patented July 29, 1947

2,424,894

UNITED STATES PATENT OFFICE 2,424,894

METHOD OF MAKING CARBON BISULFIDE

Leroy F. Marek, Lexington, Mass., assignor to Arthur D. Little, Inc., Cambridge, Mass., a corporation of Massachusetts Application June 6, 1945, Serial No. 597,823

8 Claims. (Cl. 23—206)

1

This invention relates to the art of producing carbon bisulfide. In particular, it is directed to a new and improved process whereby carbon bisulfide may be prepared in a continuous manner, without requiring electrical energy as the principal source of heat, and under conditions such that the amount produced is greatly in excess of the one pound or less per hour per cubic foot of reactor volume obtained in the best of the present commercial processes known to me.

This is a continuation-in-part of co-pending application of Avery and Marek, Serial No. 427,538, filed January 21, 1942.

Commercial production of carbon bisulfide is based upon the reaction of sulfur vapor on carbon at temperatures upwards of about 800° C. It is customarily carried out either as a batch operation in externally fired retorts, or as a continuous operation in internally heated electric furnaces. Each of these methods presents serious drawbacks connected with vaporization of sulfur, and the application of heat in an efficient, controlled and economical manner. The advantages of the process of this invention will be evident from the discussion which follows and by reference to the accompanying drawings.

The vaporization of sulfur in a continuous manner permitting controlled feeding of sulfur vapor at a high rate and with proper distribution throughout the cross section of active carbon in the retort or furnace where the reaction takes place, is inherently difficult because of the peculiar physical properties of sulfur.

When pure sulfur is heated, it first melts at about 115° C. to a liquid having a viscosity about 10-fold that of water at room temperature. Then beginning at about 150° C. and increasing very rapidly at 160° C. it undergoes a polymerization-like change which causes an extreme increase in viscosity to over 50,000-fold that of room-temperature water in the temperature interval of about 170° to 200° C. and finally as the temperature is raised further it becomes progressively less viscous until at the normal boiling point of 444.7° C. it has a viscosity of about 80-fold that of room-temperature water. Room-temperature water has a viscosity just under 1.0 centipoise. This region of extremely high viscosity gives sulfur the characteristic behavoir of a resolidification during heating and makes it impossible

2 to vaporize sulfur in continuously-fed, tubular heaters for supplying a zone of reactive carbon with sulfur vapor to form carbon bisulfide. For that reason carbon and sulfur are sometimes mixed in required proportions, as in the batch retort process, and charged at suitable intervals to the heated retort. Alternatively, as in the electric furnace method, a bed of active carbon is maintained in a furnace by charging the carbon through the top of the furnace at suitable intervals, and usually sulfur is fed as required, near the bottom of the furnace. In this case heat required to maintain temperature conditions within the active carbon mass is developed by passing electric current through the carbon by means of suitably disposed electrodes. This method, while effective and offering the advantages of continuous operation, nevertheless requires the use of expensive electric power, and does not afford good control over temperature conditions throughout the carbon mass, or over the distribution of sulfur vapor as it passes through the carbon mass.

In accordance with the present invention, these and other difficulties with the known processes are overcome by the utilization of an agent or agents which serve to maintain the viscosity of the sulfur, when in the molten condition, below about 500 centipoises. These agents, which for convenience are referred to herein as "fluidifying agents," act upon the molten sulfur generally as inhibitors of the polymerization-like changes which cause the extremely high viscosity of the molten sulfur. These fluidifying agents are considered to be effective for the purposes of this invention when they hold the viscosity of the sulfur treated by them, when the sulfur is above its melting point, at less than about one per cent of the maximum viscosity attained by molten sulfur alone.

Briefly stated, the present invention comprises the steps of vaporizing totally a reaction mixture having a maximum viscosity, when molten, of less than about 500 centipoises and containing sulfur capable of reacting with heated carbonaceous material to form carbon bisulfide; reacting the vapors and carbonaceous material at a temperature in excess of about 700° C.; and recovering the resulting carbon bisulfide.

The first of the foregoing steps of this process may be carried out with the use of any one of a number of fluidifying agents. It is important that the reaction mixture formed from them should possess four characteristics—first, it should have a maximum viscosity, when molten, of less than about 500 centipoises; second, it should contain sulfur which is capable of combining with heated carbonaceous material to form carbon bisulfide when vaporized; third, it should be capable of being completely volatilized to form vapor; and fourth, the fluidifying agent should not react under the conditions of the process to form undesirable compounds.

We have found that a number of substances are useful as fluidifying agents for the preparation of such reaction mixtures. Among such substances are benzothiamyl bisulfide, phenyl phosphine sulfide, and tetramethyl thiuram bisulfide; and a number of non-sulfur-bearing aromatic hydrocarbon derivatives, including alpha naphthol, alpha chloronaphthalene (technical), alpha bromonaphthalene (technical), p-dibromobenzene, p-cyclohexyl phenol, aniline, butyraldehyde aniline, triphenyl phosphate, and various guanidines such as diphenyl guanidine and di-o-tolyl guanidine.

The amount of any given fluidifying agent required in practicing this invention depends upon the effectiveness of the particular agent for the purpose. This invention is not predicated upon actual chemical reaction between sulfur and the fluidifying agents to form specific compounds, although such reactions may take place in some instances, while in others the association between the sulfur and the fluidifying agent may be purely physical. The resulting compositions of sulfur and fluidifying agent, whether or not containing chemical compounds of the two, are referred to herein as reaction mixtures, for convenience.

The normal increase in the viscosity of sulfur which occurs with increasing temperatures up to about 175° C. (see Fig. 1) may be prevented by either one of two ways. The first is by the use of small amounts of a fluidifying agent such as those with which this application deals; the other is the use of relatively large quantities of solvents or materials which react with sulfur to form compounds which are solvents for sulfur. The latter group is represented by such materials as carbon bisulfide and sulfur chloride and the halogens. As described in my copending application, Serial No. 427,538 filed jointly with Julian M. Avery on January 21, 1942, such products are effective when the atomic ratio of sulfur to halogen content is, for example, between 1 to 2 and 2 to 1, and greater than .5. Such amounts are to be contrasted with the catalytic-like effect of the true fluidifying agents described in this application, which are used in quantities of less than 5% by weight of that of the sulfur and effective in amounts in the order of one or two per cent. This is true even though the various agents which may be employed are not equally effective, as they are all sufficiently so to maintain the viscosity of sulfur below 500 centipoises when present in quantities of less than 5%.

An important property possessed by each of the foregoing reaction mixtures of sulfur and fluidifying agent is that of a maximum viscosity, when molten, below about 500 centipoises, as compared with a maximum viscosity, when molten, of over 50,000 centipoises for pure sulfur. One practical advantage of this property of the foregoing reaction mixtures is that they may be heated from room temperature to volatilizing temperatures and volatilized completely while passing continuously through suitable tubular heaters.

Any suitable method may be employed to determine the viscosity of a substance whose use in this process is contemplated. The viscosity values set forth herein were determined through the use of a Stormer viscosimeter which was not equipped with a central vane. The reaction mixture may be vaporized in any suitable manner, for example, by being passed continuously through a tube immersed in a bath having a temperature above the vaporization temperature of the total mixture. Passing the mixture through a metal tube about one inch in diameter immersed in a bath of molten lead has, for example, been found to be satisfactory for total vaporization of the reaction.

The second of the hereinbefore-mentioned steps of this process, viz: reacting the vapors of the reaction mixture with heated carbonaceous material, may be carried out in any suitable way, for example, by bringing the vapors into effective contact with heated charcoal at temperatures above about 700° C.

The third step, namely that of separating the resulting carbon bisulfide from the other reaction products, may be carried out in any suitable way, for example, by condensation and fractionation.

The present process will be better understood by those skilled in the art from the following detailed description of the process as applied to one of the foregoing substances:

The fluidifying agent is added to sulfur with stirring or agitation and heating to the liquid state so that the resulting fluid mixture contains not more than 5% by weight of the fluidifying agents. This fluid mixture is vaporized in any convenient manner, as for example by being forced through a metal tube immersed in a bath of molten lead. The resulting vapors are then preferably super-heated to above about 700° C., and passed through a reactor chamber containing a quantity of carbonaceous material, preferably charcoal. A reaction takes place between the vaporized sulfur and the charcoal at temperatures above about 700° C., with the result that carbon bisulfide and other products are formed.

The gaseous products withdrawn from the reactor chamber may and usually do contain relatively small amounts of non-condensible gases such as $SO_2$; $CO_2$ and $H_2S$, which may be vented from the system. Condensible gases in addition to $CS_2$ may also be present such as unreacted sulfur which may be condensed and removed. If fractionation is necessary, it is preferably carried out by the application of sensible heat of the gases issuing from the reactor chamber, and the resulting commercially pure carbon bisulfide is separated therefrom. Any sulfur which passes unreacted through the reaction chamber is recirculated through the system.

Inasmuch as there is incurred a substantial loss of the fluidifying substance used to treat the sulfur as the reaction mixture passes through the system, provision must be made for replenishment. The preferred method of maintaining the amount of this substance in the system is to introduce it directly into the mixing tank; for example, if p-cyclohexylphenol is employed as the fluidifying agent, it may be introduced directly into the sulfur mixing tank to the extent of about 1% by weight of the fresh sulfur charged.

Sulfur and carbonaceous material must of course be added to the system as required, to replace the sulfur and carbon which are removed in the form of $CS_2$, $SO_2$, $CO_2$, and the like. Preferably the sulfur is added in the mixing tank while the contents of that vessel are maintained at a temperature above the melting point, and the carbonaceous material (e. g. charcoal) may be conveniently introduced into the system through a suitable opening at the top of the reactor chamber. Since commercial charcoal ordinarily contains significant amounts of hydrogen and oxygen, which cause the production, during the reaction, of gases such as $H_2S$, $SO_2$ and $CO_2$ which waste the reactants, such charcoal is preferably first calcined, in the usual manner for treating charcoal for use in producing carbon bisulfide by conventional processes.

In the drawings accompanying and forming a part of this specification:

Fig. 1 is a semi-logarithmic chart carrying three curves. One of these is for pure sulfur at varying viscosities through increasing temperatures. Another shows the viscosity of sulfur containing 1% cyclohexylphenol, and the third shows the effect of adding 2% alpha napthol.

Figure 2:
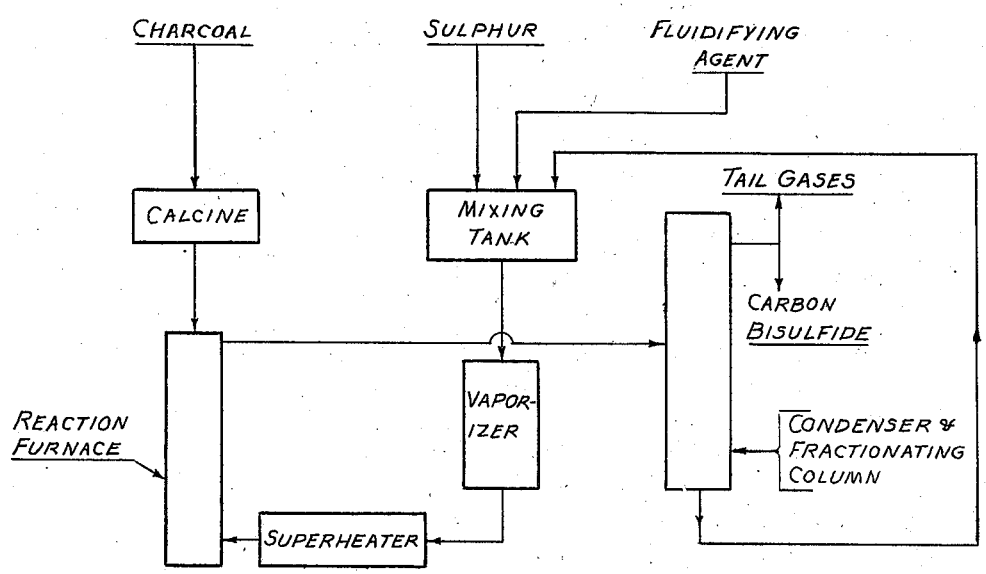

Fig. 2 is a diagrammatic flow-sheet which indicates an advantageous sequence of steps in carrying out the present invention for making carbon bisulfide from sulfur when using a fluidifying agent.

The viscosity in centipoises is plotted against temperature in degrees centigrade.

The viscosity of pure sulfur is shown between its melting point and its boiling point. This curve shows initially, a decrease in viscosity with an increase in temperature followed by extremely rapid increase in viscosity with relatively small increases in temperature in the range from 160° C. to about 190° C. Pure sulfur attains a maximum viscosity of over 50,000 centipoises at about 190° C.; thereafter the viscosity decreases with increasing temperature until the viscosity becomes less than 100 centipoises at the boiling point of pure sulfur.

The viscosity of the sulfur containing 1% cyclohexylphenol follows the initial curve of pure sulfur until the abrupt rise of pure sulfur takes place at about 160° C. At this point the viscosity of the treated sulfur continues to rise, and reaches its maximum at about the same temperature as that for pure sulfur. This maximum for the fluidified sulfur is, however, below 30 centipoises as contrasted with over 50,000 centipoises at 187° C. for pure sulfur. The effect is therefore considerable.

In addition to the three curves shown, five points at 200° C. are given for other fluidifying agents. These are approximately the points of maximum viscosity and are given to illustrate the effect of these five other materials. The five materials used were added to the extent of 2% by weight, based upon the sulfur.

When a mixture containing 98% commercial sulfur and 2% alpha naphthol is heated through the range between its fusion and its vaporization temperature, it acts in the manner shown by the curve in Fig. 1. A comparison between that curve and that of pure sulfur indicates that the maximum viscosity attained by the alpha naphthol-sulfur mixture is much less than 1% of the maximum viscosity attained by pure sulfur.

A table of viscosities of a mixture of 99% sulfur and 1% p-cyclohexylphenol at various temperatures is given below. The figures given are those plotted in Fig. 1.

| Temperature, °C. | Vis. in Centipoises |
| --- | --- |
| 130 | 8.4 |
| 150 | 7.5 |
| 165 | 13.7 |
| 175 | 21.4 |
| 185 | 26.2 |
| 190 | 28.2 |
| 193 | 26.5 |
| 195 | 25.6 |
| 210 | 19.3 |
| 230 | 11.8 |

On the 200° C. line are five points representing the viscosities of a 2% addition of fluidifying agent to sulfur. Point 1 shows the effect of Captax (mercaptobenzothiazole) as the fluidifying agent; point 2, phenyl phosphine sulfide; point 3, Altax (benzothiazyl disulfide); point 4, "D. O. T. G." (di-o-tolyl-guanidine); and point 5, aniline.

It will be understood that the foregoing fluidifying agents represent the performance of the mixture identified thereby in respect to viscosities and indicate that these fluidifying agents are suitable for use with this invention.

The process as depicted by Figure 2 may be considered to be begun when sulfur and fluidifying agent are introduced into the "mixing tank." Upon completion of the mixing step, the resulting reaction mixture is passed to the "vaporizer" where it is completely vaporized and sent on to the "superheater." After the vapors are sufficiently superheated, they pass into the "reaction furnace" where they react with the charcoal to form carbon bisulfide. The resulting gaseous reaction products then pass into the "condenser and fractionating column," wherein the temperature of the gases is reduced sufficiently to liquefy the readily condensible products including carbon bisulfide and sulfur; the difficultly condensible gases such as $H_2S$ and $CO_2$ are vented as indicated by "tail gases." The carbon bisulfide is readily separated by fractionation. The charcoal used in the reaction, after calcination as indicated, may be fed to the reaction furnace as desired through a double bell hopper to prevent escape of gases from the system.

Having thus described the present invention so that others skilled in the art may be able to understand and practice the same, I state that what I desire to secure by Letters Patent is defined in what is claimed.

What is claimed is:

1. The process of producing carbon bisulfide which comprises producing a molten sulfur composition containing an organic agent which lowers the maximum viscosity of said composition when used in an amount of less than about 5%, giving said molten composition a maximum viscosity of less than about 500 centipoises, freely passing said molten composition through a zone of increasing temperature until the sulfur is vaporized, reacting the resulting vapors with carbonaceous material at a temperature above about 700° C. so as to produce reaction products containing carbon bisulfide, cooling the reaction products, and recovering carbon bisulfide therefrom.

2. The process according to claim 1 wherein the organic agent is a guanidine selected from the group consisting of diphenyl guanidine and diorthotolyl guanidine.

3. The process according to claim 1 wherein the organic agent is a non-sulfur bearing aromatic hydrocarbon derivative selected from the group consisting of alpha chloronaphthalene (technical), alpha bromonaphthalene (technical), p-dibromobenzene, aniline, butyraldehyde aniline, and triphenyl phosphate.

4. The process according to claim 1 wherein the organic agent is an organic sulfide of the group consisting of benzothiazyl bisulfide, phenyl phosphine sulfide, and tetramethyl thiuram bisulfide.

5. The process according to claim 1 wherein the organic agent is present in an amount less than about 2%.

6. The process according to claim 1 wherein the carbonaceous material is calcined wood charcoal.

7. The process of producing carbon bisulfide which comprises melting a mixture consisting of sulfur and an organic agent which lowers the maximum viscosity of the resulting molten composition when used in an amount of less than about 5%, the weight ratio of said sulfur to said agent being at least about 100 to 5, giving the resulting molten composition a maximum viscosity of less than about 500 centipoises, freely passing said molten composition through a zone of increasing temperature until the sulfur is vaporized, and reacting the resulting vapors with carbonaceous material at a temperature above about 700° C. so as to produce carbon bisulfide.

8. The process of producing carbon bisulfide which comprises melting a mixture consisting of sulfur and an organic agent which lowers the maximum viscosity of the resulting molten composition when used in an amount of less than about 5%, said agent being present in an amount of from 1% to 2% by weight of the sulfur, giving the resulting molten composition a maximum viscosity of less than about 500 centipoises, freely passing said molten composition through a zone of increasing temperature until the sulfur is vaporized, and reacting the resulting vapors with carbonaceous material at a temperature above about 700° C. so as to produce carbon bisulfide.

LEROY F. MAREK.

REFERENCES CITED

The following references are of record in the file of this patent:

UNITED STATES PATENTS

| Number | Name | Date |
|---|---|---|
| 1,849,140 | Dow | Mar. 15, 1932 |
| 2,392,629 | Avery et al. | Jan. 8, 1946 |
| 1,615,659 | Siedler | Jan. 25, 1927 |

OTHER REFERENCES

Zeitschirft fur Physickalische Chemie; article by L. Rotinjanz, vol. 62 (1908), pages 617–620.